United States Patent
Hu et al.

(10) Patent No.: US 12,363,769 B2
(45) Date of Patent: Jul. 15, 2025

(54) CELL SEARCH PROCEDURE AND INITIAL BWP CONFIGURATION FOR REDUCED CAPABILITY UE DEVICE

(71) Applicant: Samsung Electronics Co., Ltd., Suwon-si (KR)

(72) Inventors: Liang Hu, San Diego, CA (US); Jung Hyun Bae, San Diego, CA (US); Jungmin Park, Seoul (KR); Hsien-Ping Lin, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 663 days.

(21) Appl. No.: 17/234,754

(22) Filed: Apr. 19, 2021

(65) Prior Publication Data
US 2021/0329718 A1    Oct. 21, 2021

Related U.S. Application Data

(60) Provisional application No. 63/013,391, filed on Apr. 21, 2020, provisional application No. 63/037,531, filed on Jun. 10, 2020.

(51) Int. Cl.
   *H04W 76/11*      (2018.01)
   *H04L 1/00*       (2006.01)
   *H04W 72/23*      (2023.01)

(52) U.S. Cl.
   CPC .......... *H04W 76/11* (2018.02); *H04L 1/0061* (2013.01); *H04W 72/23* (2023.01)

(58) Field of Classification Search
   CPC ...... H04W 76/11; H04W 72/23; H04L 1/0061
   See application file for complete search history.

(56) References Cited

U.S. PATENT DOCUMENTS

| | | | |
|---|---|---|---|
| 10,492,157 B2 | 11/2019 | Nam et al. | |
| 11,051,220 B1* | 6/2021 | Song | H04L 5/001 |
| 2019/0254073 A1 | 8/2019 | Sheng et al. | |
| 2020/0045658 A1 | 2/2020 | Nam et al. | |
| 2020/0084705 A1 | 3/2020 | Xu et al. | |
| 2020/0137741 A1 | 4/2020 | Zhou et al. | |
| 2020/0187171 A1 | 6/2020 | Hwang et al. | |
| 2020/0228966 A1 | 7/2020 | Xu et al. | |
| 2020/0252916 A1 | 8/2020 | Abdoli et al. | |

(Continued)

FOREIGN PATENT DOCUMENTS

| | | | |
|---|---|---|---|
| CN | 110602731 A | 12/2019 | |
| CN | 110603877 A | 12/2019 | |

(Continued)

OTHER PUBLICATIONS

US Office Action dated Apr. 27, 2023, issued in U.S. Appl. No. 17/234,761 (22 pages).

(Continued)

*Primary Examiner* — Curtis B Odom
(74) *Attorney, Agent, or Firm* — Lewis Roca Rothgerber Christie LLP

(57) ABSTRACT

A system and method for accommodating reduced capability user equipment in a mobile network. The method may include monitoring, by a bandwidth-limited User Equipment (UE), a subset of a core resource set (CORESET), the use of a special synchronization signal for bandwidth-limited UEs, or the use of bandwidth part (BWP) switching.

9 Claims, 13 Drawing Sheets

(56) References Cited

U.S. PATENT DOCUMENTS

| | | |
|---|---|---|
| 2020/0305179 A1 | 9/2020 | Li |
| 2020/0344097 A1 | 10/2020 | Si et al. |
| 2020/0344761 A1 | 10/2020 | Amuru et al. |
| 2020/0404600 A1 | 12/2020 | Ly et al. |
| 2020/0404601 A1 | 12/2020 | Lin et al. |
| 2021/0007085 A1 | 1/2021 | Lin et al. |
| 2021/0037439 A1 | 2/2021 | Harada et al. |
| 2021/0195579 A1 | 6/2021 | Lei et al. |
| 2021/0235441 A1 | 7/2021 | Wang et al. |
| 2021/0250929 A1 | 8/2021 | Sakhnini et al. |
| 2021/0250930 A1 | 8/2021 | Sakhnini et al. |
| 2021/0274562 A1 | 9/2021 | Takeda et al. |
| 2021/0329574 A1 | 10/2021 | Ang et al. |
| 2022/0166594 A1* | 5/2022 | Zhang .................. H04W 72/21 |
| 2022/0271894 A1 | 8/2022 | Li et al. |
| 2022/0353807 A1 | 11/2022 | He et al. |
| 2022/0377705 A1 | 11/2022 | Wang et al. |
| 2022/0408479 A1 | 12/2022 | Wang et al. |
| 2023/0007524 A1 | 1/2023 | Wang et al. |
| 2023/0007603 A1 | 1/2023 | Sui et al. |
| 2023/0119744 A1* | 4/2023 | Lin ........................ H04L 5/001 370/329 |

FOREIGN PATENT DOCUMENTS

| | | |
|---|---|---|
| TW | 202031077 A | 8/2020 |
| WO | WO 2020/149978 A1 | 7/2020 |
| WO | WO 2020/190205 A1 | 9/2020 |
| WO | WO 2021/112740 A1 | 6/2021 |
| WO | WO 2021/163857 A1 | 8/2021 |
| WO | WO 2021/199356 A1 | 10/2021 |
| WO | WO 2021/199357 A1 | 10/2021 |
| WO | WO 2021/201757 A1 | 10/2021 |

OTHER PUBLICATIONS

US Final Office Action dated Aug. 31, 2023, issued in U.S. Appl. No. 17/234,761 (28 pages).
US Notice of Allowance dated Dec. 22, 2023, issued in U.S. Appl. No. 17/234,761 (15 pages).
Unpublished U.S. Appl. No. 17/234,761, filed Apr. 19, 2021.
US Office Action dated Nov. 21, 2024, issued in U.S. Appl. No. 18/642,750 (25 pages).
Taiwanese Office Action dated Mar. 31, 2025, issued in Taiwanese Patent Application No. 110114323, 32 pages.

* cited by examiner

| Step | Stage | DL BWP | UL BWP | Processing |
|---|---|---|---|---|
| 0 | PSS and SSS Decode | | | DL Synchronization |
| 1 | MIB decode | | | UE decode MIB and get CORESET #0 configuration |
| 2 | RMSI decode | CORESET #0 | | Get Initial DL-BWP and Initial UL-BWP setting for RMSI decoding |
| 3 | Msg-1-UE >---> gNB | | Initial UL-BWP | Random Access Request to gNB |
| 4 | Msg-2-UE <---< gNB | CORESET #0 | | Random Access Response (RAR) gNB |
| 5 | Msg-3-UE >---> gNB | | Initial UL-BWP | RRC connection request |
| 6 | Msg-4-UE <---< gNB | CORESET #0 | | RRC connection setup Configure UE specific BWP (default/1st active/other) BWP If not configured, still use initial BWP |
| 7 | Msg-5-UE >---> gNB | 1st Active BWP | 1st Active BWP | RRC set-up completed Initial BWP is the 1st Active BWP if no additional configuration carried in Msg4 |

FIG. 3A

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | Reserved | | | |

FIG. 3B

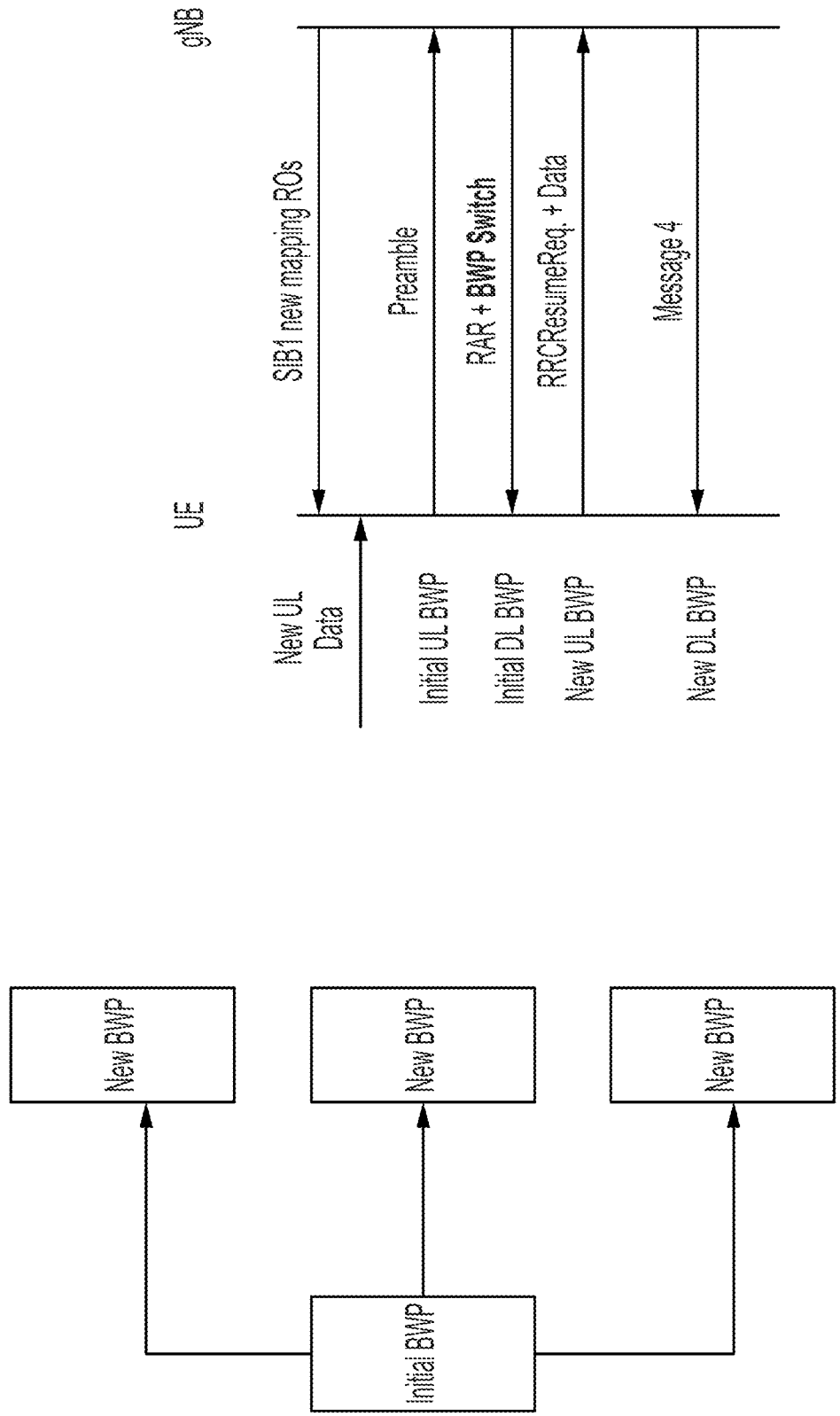

CELL SEARCH PROCEDURE AND INITIAL BWP CONFIGURATION FOR REDUCED CAPABILITY UE DEVICE

CROSS-REFERENCE TO RELATED APPLICATION(S)

The present application claims priority to and the benefit of (i) U.S. Provisional Application No. 63/013,391, filed Apr. 21, 2020, entitled "INITIAL ACCESS PROCEDURE AND INITIAL BWP CONFIGURATION FOR BANDWIDTH LIMITED NR DEVICE", and of (ii) U.S. Provisional Application No. 63/037,531, filed Jun. 10, 2020, entitled "INITIAL ACCESS PROCEDURE AND INITIAL BWP CONFIGURATION FOR BANDWIDTH LIMITED NR DEVICE"; both of the applications identified in this paragraph are incorporated herein by reference.

FIELD

One or more aspects of embodiments according to the present disclosure relate to mobile communications, and more particularly to a system and method for accommodating reduced capability user equipment in a mobile communications network.

BACKGROUND

In mobile communications networks, useful applications may exist for user equipment that is small, or low-cost, or that consumes little power. Such user equipment may be more readily produced by reducing its capabilities compared to other user equipment. Unless accommodations are made for such reduced capabilities, however, the reduction in capabilities may in some circumstances result in a failure to establish a connection between the network and the user equipment.

Thus, there is a need for a system and method for accommodating reduced capability user equipment in a mobile network.

SUMMARY

According to an embodiment of the present disclosure, there is provided a method, including: acquiring, by a bandwidth-limited user equipment (UE) having a bandwidth capability, a synchronization signal block including a master information block (MIB); identifying an initial control resource set (CORESET), based on a set of identifying bits from the MIB; monitoring, by the bandwidth-limited UE, a portion of the initial CORESET; and acquiring a Downlink Control Information (DCI).

In some embodiments: the initial CORESET occupies a bandwidth greater than the bandwidth capability of the bandwidth-limited UE; and the portion of the initial CORESET is a set portion of the initial CORESET occupying a bandwidth within the bandwidth capability of the bandwidth-limited UE.

In some embodiments: the initial CORESET occupies a bandwidth greater than the bandwidth capability of the bandwidth-limited UE; the portion of the initial CORESET occupies a bandwidth within the bandwidth capability of the bandwidth-limited UE; and the portion of the initial CORESET is specified by reserved bits of the MIB.

In some embodiments, the DCI includes a cyclic redundancy code (CRC) scrambled with a bandwidth-limited SI-RNTI.

In some embodiments, the method further includes acquiring a bandwidth-limited System Information Block #1 (SIB1) through a scheduled Physical Downlink Shared Channel (PDSCH).

According to an embodiment of the present disclosure, there is provided a method, including: acquiring, by a bandwidth-limited UE, a bandwidth-limited synchronization signal; acquiring, by the bandwidth-limited UE, an extended MIB (e-MIB) containing a first set of identifying bits; identifying an initial control resource set (CORESET), based on the first set of identifying bits; and monitoring, by the bandwidth-limited UE, the initial CORESET.

In some embodiments, the bandwidth-limited synchronization signal is a bandwidth-limited secondary synchronization signal.

In some embodiments, the monitoring of the initial CORESET includes monitoring, by the bandwidth-limited UE, the initial CORESET for a DCI including a cyclic redundancy code (CRC) scrambled with a bandwidth-limited System Information Radio Network Temporary Identifier (SI-RNTI).

In some embodiments, the method further includes acquiring a bandwidth-limited System Information Block #1 (SIB1) through a scheduled Physical Downlink Shared Channel (PDSCH).

In some embodiments, the bandwidth-limited synchronization signal is a bandwidth-limited primary synchronization signal.

In some embodiments, the monitoring of the initial CORESET includes monitoring, by the bandwidth-limited UE, the initial CORESET for a DCI including a cyclic redundancy code (CRC) scrambled with a bandwidth-limited System Information Radio Network Temporary Identifier (SI-RNTI).

According to an embodiment of the present disclosure, there is provided a method, including: acquiring, in a signal from a network, by a bandwidth-limited user equipment (UE) having a bandwidth capability, a System Information Block #1 (SIB1), the SIB1 defining a legacy initial BWP; sending, by the bandwidth-limited UE, a first message, to the network; receiving, by the bandwidth-limited UE, a second message, from the network; sending, by the bandwidth-limited UE, a third message, to the network; and receiving, by the bandwidth-limited UE, a fourth message, from the network; wherein: the sending of the third message includes sending the third message in a first initial BWP, different from the legacy initial BWP; or the receiving of the fourth message includes receiving the fourth message in a second initial BWP, different from the legacy initial BWP.

In some embodiments, the method further includes receiving, by the bandwidth-limited UE, in the second message, a first BWP identifier, identifying the first initial BWP, wherein the sending of the third message includes sending the third message in the first initial BWP.

In some embodiments, the receiving of the fourth message includes receiving the fourth message in the second initial BWP.

In some embodiments, the second initial BWP is different from the first initial BWP.

In some embodiments, the method further includes receiving, by the bandwidth-limited UE, in the second message, a second BWP identifier, identifying the second initial BWP.

In some embodiments, the method further includes receiving, by the bandwidth-limited UE, in the SIB1 or in an extended SIB1 (eSIB1), a second BWP identifier, identifying the second initial BWP.

In some embodiments, the method further includes receiving, by the bandwidth-limited UE, in the SIB1 or in an extended SIB1 (eSIB1), a list of available initial BWPs, including the first initial BWP, wherein the sending of the first message includes sending the first message in the first initial BWP.

In some embodiments, the method further includes selecting, by the bandwidth-limited UE, the first initial BWP from the list of available initial BWPs.

In some embodiments, the method further includes notifying the network, by the bandwidth-limited UE, in the first message, of the bandwidth-limited UE's selection of the first initial BWP.

BRIEF DESCRIPTION OF THE DRAWINGS

These and other features and advantages of the present disclosure will be appreciated and understood with reference to the specification, claims, and appended drawings wherein:

FIG. 3A is a table of bandwidth part configurations, according to an embodiment of the present disclosure;

FIG. 3B is a table of resource blocks and slot symbols, according to an embodiment of the present disclosure;

FIG. 6A is a bandwidth part diagram, according to an embodiment of the present disclosure;

FIG. 6B is an illustration of an initial access process, according to an embodiment of the present disclosure;

DETAILED DESCRIPTION

Figure 1:
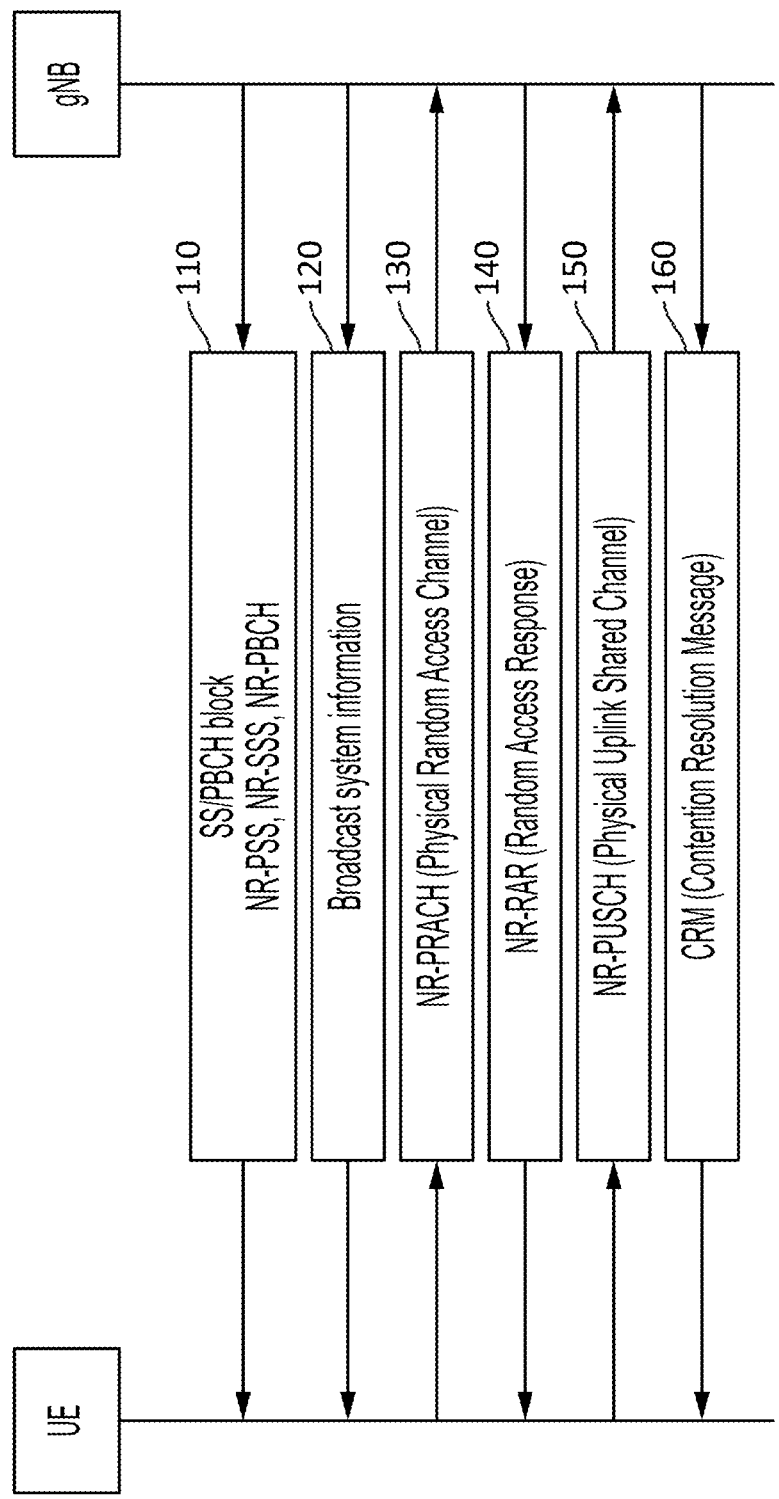
FIG. 1 is an illustration of an initial access process, according to an embodiment of the present disclosure.

The detailed description set forth below in connection with the appended drawings is intended as a description of exemplary embodiments of a system and method for accommodating reduced capability user equipment in a mobile network provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In the 3rd Generation Partnership Project (3GPP) Release 17 (Rel-17) of the standard for the 5th generation mobile network (5G), in a Study Item (SID) on Reduced Capability NR devices, one of the objectives is to identify and study potential UE complexity reduction features such as User Equipment (UE) bandwidth reduction. With the introduction of bandwidth (BW) limited (BL) UEs, there may be specification impact on the UE initial access procedure (or "initial access process"), since bandwidth-limited UEs, which have lower bandwidth capability than legacy bandwidth requirements on UEs, may not be able to perform a legacy initial access procedure.

As used herein, "legacy" refers to a system lacking special provisions for accommodating bandwidth-limited UEs, or to an element of such a system (e.g., a legacy CORESET #0 or a legacy Physical Broadcast Channel (PBCH)). As used herein, certain phrases, such as "user equipment" and "downlink control information" are used as countable nouns even though the nouns they contain (e.g., "equipment" and "information") may not be countable in ordinary English. As used herein, a "bandwidth-limited UE" is a UE having bandwidth capabilities not sufficient to meet legacy bandwidth requirements on UEs. When applied to a term other than a UE, the qualifier "bandwidth-limited" means, related to a bandwidth-limited UE. It may or may not mean that the qualified term itself has (e.g., occupies) limited bandwidth. For example, a "bandwidth-limited initial CORESET" may have limited bandwidth, but a "bandwidth-limited SI-RNTI" (or SI-BL-RNTI, discussed below) need not occupy a limited bandwidth.

As an example of such specification impact, in 3GPP Release 15 (Rel-15), the legacy initial control resource set (CORESET #0) may have a maximum bandwidth of 17 MHz (assuming a 15 kHz subcarrier spacing (SCS) and 96 Physical Resource Blocks (PRBs) (each including 12 subcarriers)), which may be larger than the maximum bandwidth (e.g., 5 MHz or 10 MHz) targeted for low tier bandwidth-limited UEs. In this case, the bandwidth-limited UEs may not be able to acquire the legacy System Information Block #1 (SIB1) information via the legacy CORESET #0, and may therefore be unable to perform the initial access procedure. Moreover, the uplink initial bandwidth part (BWP) for bandwidth-limited UEs may be different than the legacy uplink initial BWP, due to the lower bandwidth capability of bandwidth-limited UEs. It may therefore be advantageous to provide mechanisms in the network and in the bandwidth-limited UEs to enable the bandwidth-limited UEs to use the reduced uplink initial BWP for uplink transmission.

The legacy initial access procedure in NR is illustrated in FIG. 1. As shown in FIG. 1, it may include (e.g., consist of) the following steps: at 110, the network base station (gNB) periodically transmits Synchronization Signal (SS) blocks (SSBs) carrying synchronization signals (including primary synchronization signals PSSs, and secondary synchronization signals (SSSs)) and Physical Broadcast Channels (PBCHs) using beam sweeping. One SS block contains one PSS symbol, one SSS symbol, and two PBCH symbols. A Synchronization Signal burst may carry one or multiple SS blocks. The combination of PSS and SSS may help to identify about 1008 physical cell identities. Each UE performs beam measurements and determines the best beam during synchronization.

Subsequently, at 120, the gNB transmits, and the UE receives and decodes, 5G New Radio (NR) system information viz. a Master Information Block (MIB) and a System Information Block (SIB) on that beam. Minimum SI (System Information) is carried on the Physical Broadcast Channel. The rest of the Remaining Minimum System Information (RMSI) and the SIB1 is carried on the Physical Downlink Shared Channel (PDSCH). The numerology used for the RMSI is indicated in the PBCH payload. CORESET #0 is dedicated for RMSI scheduling. CORESET #0 is not confined within PBCH Bandwidth. There is an RMSI Physical Downlink Control Channel (PDCCH) monitoring window associated with the SS/PBCH block, which recurs periodically. Other System Information (OSI) contains on-demand system information delivery. OSI is carried on the PDSCH using the same numerology as is used for the RMSI. At 130, the UE uses the same beam and attempts random access by transmitting a Random Access Channel (RACH) preamble (i.e., message 1, or "Message #1") on the configured RACH resource. The gNB responds with a Random Access Response RAR ("RA Response") message, which is message 2, or "Message #2". The UE then transmits, at 150, message 3, or "Message #3" (i.e., a Radio Resource Control (RRC) Connection Request) in the Physical Uplink Shared Channel (PUSCH) (e.g., NR-PUSCH) channel. The gNB then responds, at 160, with message 4, or "Message #4" (i.e., RRC Connection Setup) which is the contention resolution message and which completes the initial access process.

Figure 2:
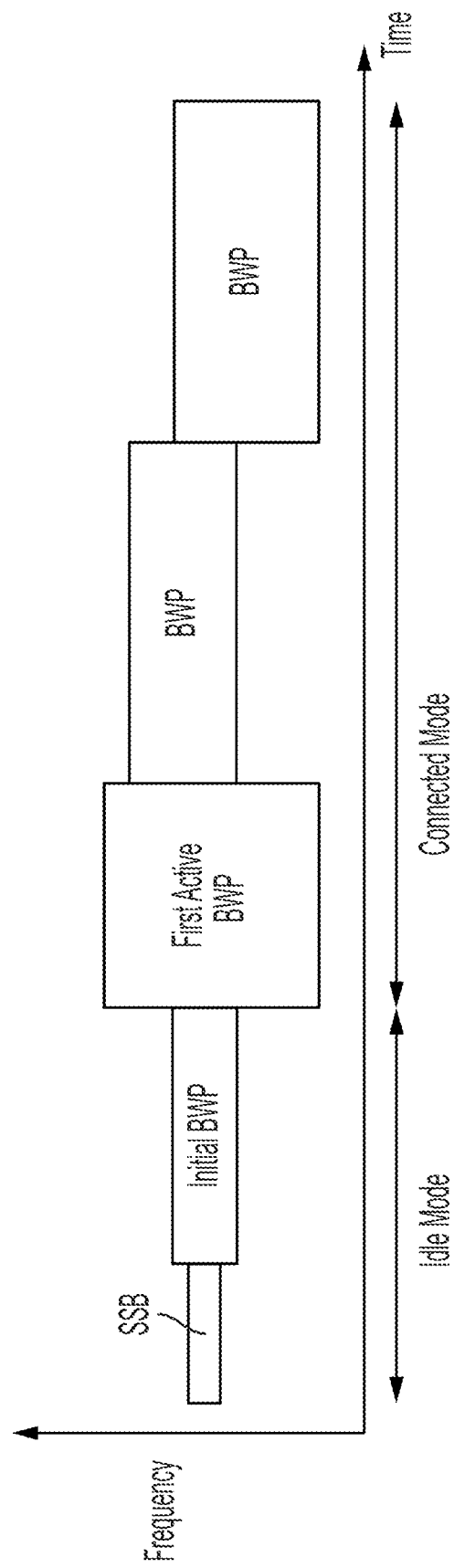
FIG. 2 is an illustration of a sequence of bandwidth parts, according to an embodiment of the present disclosure.

FIG. 2 shows the different initial BWP types available for a UE in different RRC states. In some use cases, the Idle Mode BWP may be smaller than Connected Mode BWPs. Three types of BWP are available: Initial BWP, Active BWP (UE Specific), and Default BWP (UE Specific). The Initial BWP is used to perform the initial access procedure. It includes Parameters like RMSI (Requested Minimum System Information), CORESET #0 and RMSI frequency location, bandwidth, and SCS. It can be between 24 and 96 PRBs with different settings and it may be relaxed to a wider BWP after RMSI decoding. The Active BWP is defined as UE specific. It is the first BWP within which the UE starts data transfer after RRC configuration or reconfiguration. The very first Active BWP may be different from the default BWP.

The table of FIG. 3A shows the BWP configurations at different stages of the initial access process; both uplink and downlink BWPs are considered. The BWP configuration is split into uplink and downlink parameters as well as into common and dedicated parameters. Common parameters (in BWP-UplinkCommon and BWP-DownlinkCommon) may be "cell specific" and the network may ensure the necessary alignment with corresponding parameters of other UEs. The common parameters of the initial BWP of the PCell are also provided via system information. For all other serving cells, the network may provide the common parameters via dedicated signaling.

The CORESET #0 configurations are pre-defined in a set of tables, and the index of the table to be used is contained in the MIB message. The table of FIG. 3B shows one example of a set of resource blocks and slot symbols of a CORESET #0 configuration when [SS/PBCH block, PDCCH] SCS is [15,15] kHz (i.e., the SCS of SS/PBCH block and PDCCH are 15 kHz and 15 kHz respectively) for frequency bands with minimum channel bandwidth 5 and 10 MHz. The initial CORESET may be the one for SIB1/PDCCHType0. As used herein, "initial CORESET" means CORESET #0.

In some embodiments, the accommodating of bandwidth-limited UEs in the initial access process may be accomplished by various methods, identified herein as Embodiment 1, Embodiment 2, and Embodiment 3, with various options possible for Embodiments 1 and 3. These embodiments are explained herein, for ease of explanation, in the context of a full-bandwidth UE and a bandwidth-limited UE, both of which are performing the initial access process. In operation, many full-bandwidth UEs and many bandwidth-limited UEs may be interacting with the gNB at any time.

Figure 4:
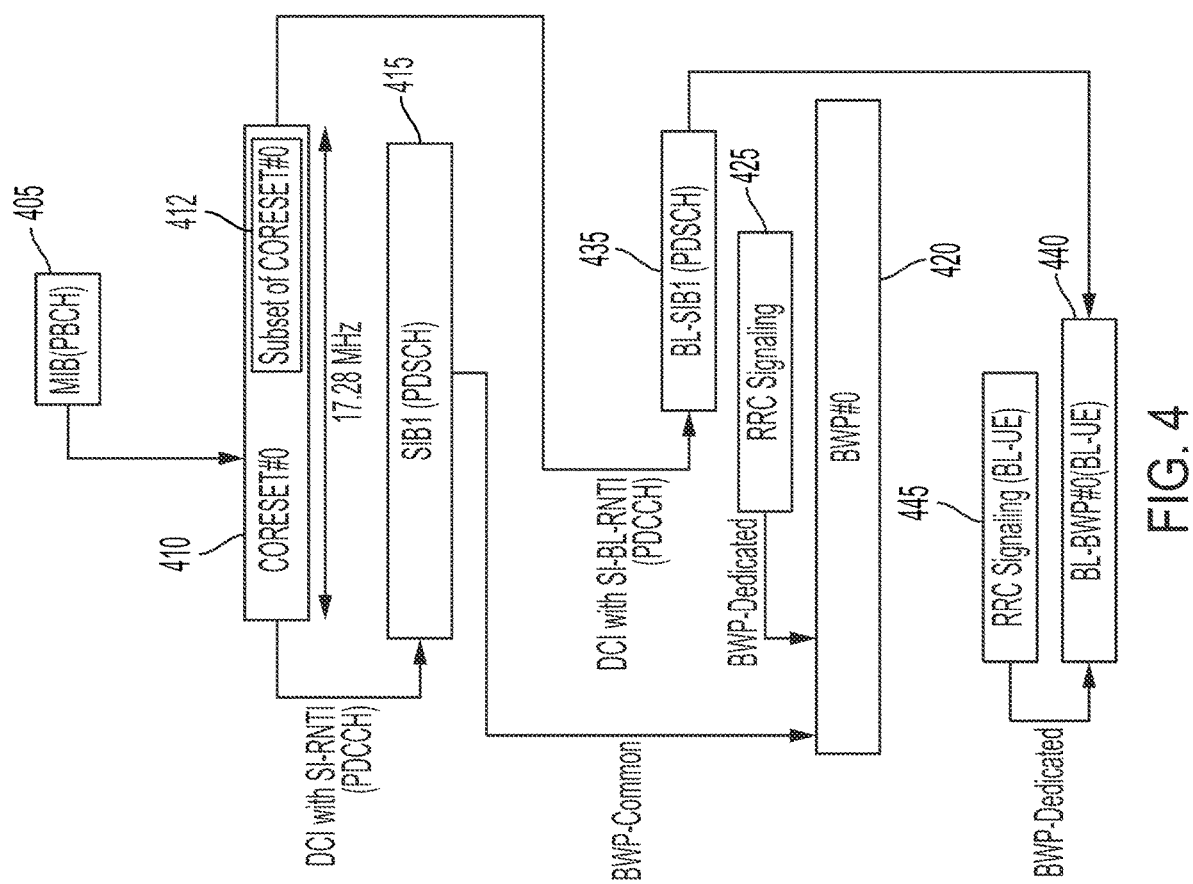
FIG. 4 is an illustration of an initial access process, according to an embodiment of the present disclosure.

In one embodiment, referred to herein as Embodiment 1, an "RRC BL-SIB1" message is used for the initial access process, by a bandwidth-limited UE, as illustrated in FIG. 4. Referring to FIG. 4, both the legacy UE, or "full-bandwidth UE", and the bandwidth-limited UE acquire the Signal Synchronization Block (SSB) at 405 and decode the MIB. From the MIB, both the legacy UE and the bandwidth-limited UE read the CORESET #0 configuration.

The legacy UEs monitor CORESET #0 for DCI with CRC scrambled by SI-RNTI and the bandwidth-limited UEs monitor CORESET #0 for DCI with CRC scrambled by SI-BL-RNTI. If CORESET #0 is configured with a bandwidth greater than the bandwidth capability of the bandwidth-limited UE, then the bandwidth-limited UE monitors a subset 412 of CORESET #0. This subset of CORESET #0, or the rule for determining this subset of CORESET #0, may be pre-configured to bandwidth-limited UEs. The bandwidth-limited UE then acquires, at 435, BL-SIB1 through scheduled Physical Downlink Shared Channel PDSCH. The presence of the RRC message BL-SIB1 indicates to the bandwidth-limited UE that the cell (e.g., the network node (gNB)) supports bandwidth-limited UEs. If the bandwidth-limited UE does not detect BL-SIB1, then it stops initial access to this cell. The bandwidth-limited UE may then, at 440, select BL-BWP #0 (a bandwidth part that is within its capabilities), based on BL-SIB1, and receive and decode RRC signaling at 445 to configure a dedicated BWP for the specific bandwidth-limited UE.

The bandwidth-limited UE may determine which subset of CORESET #0 to monitor, if CORESET #0 is configured with a bandwidth greater than the bandwidth capability of the bandwidth-limited UE, in one of the following two manners (referred to as Option 1 and Option 2), for example.

In Option 1, the DCI for a bandwidth-limited UE is always transmitted over a specific set of Control Channel Elements CCEs within CORESET #0 when CORESET #0 is configured with a bandwidth greater than the bandwidth capability of the bandwidth-limited UE. The specific set of Control Channel Elements CCEs within CORESET #0 may be referred to as a "set portion of the initial CORESET"; as used herein, a "set portion" is a portion that is defined before the beginning of the initial access process. The bandwidth-limited UE is pre-configured with this specific set of CCEs within CORESET #0 to monitor the DCI for bandwidth-limited UEs, or the bandwidth-limited UE is pre-configured with a rule for determining the specific set of CCEs within the CORESET #0 to monitor DCIs for bandwidth-limited UEs.

In Option 2, additional reserved bits (e.g., 1 or 2 bits) in the MIB may be used to indicate which portion of CORESET #0 the bandwidth-limited UE should monitor for the DCI when CORESET #0 is configured with a bandwidth greater than the bandwidth capability of the bandwidth-limited UE.

The full-bandwidth UE may at 415, it receive and decode a SIB1 through a scheduled Physical Downlink Shared Channel (PDSCH), based on the DCI, and from the SIB1 it may obtain the initial BWP configuration (BWP #0) for both uplink and downlink. The full-bandwidth UE may then, at 420, select BWP #0, based on SIB1, and receive and decode RRC signaling at 425 to configure a dedicated BWP for the specific full-bandwidth UE.

The use of Embodiment 1 may (i) consume additional PDSCH resources for transmitting BL-SIB1, (ii) consume additional PDCCH resources for scheduling BL-SIB1, (iii) result in the duplication of a number of SIB1 Information Elements (IE's) in BL-SIB1, and (iv) if Option 2 is used, consume reserved bits in the MIB. However, the use of Embodiment 1 may have the advantage that it is capable of supporting all CORESET #0 configurations for Rel-15 legacy UEs.

Figure 5A:
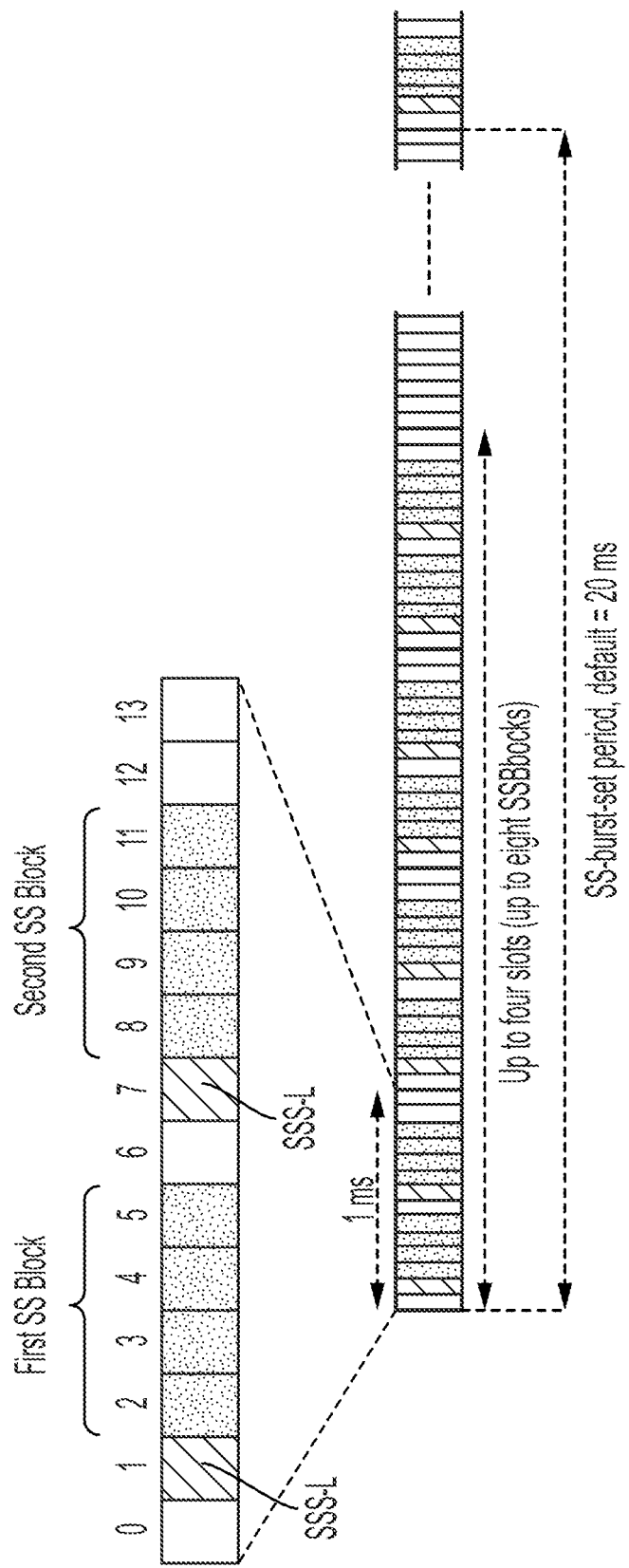
FIG. 5A is an illustration of a Primary Synchronization Signal, Secondary Synchronization Signal, and Physical Broadcast Channel structure, according to an embodiment of the present disclosure.
Figure 5B:
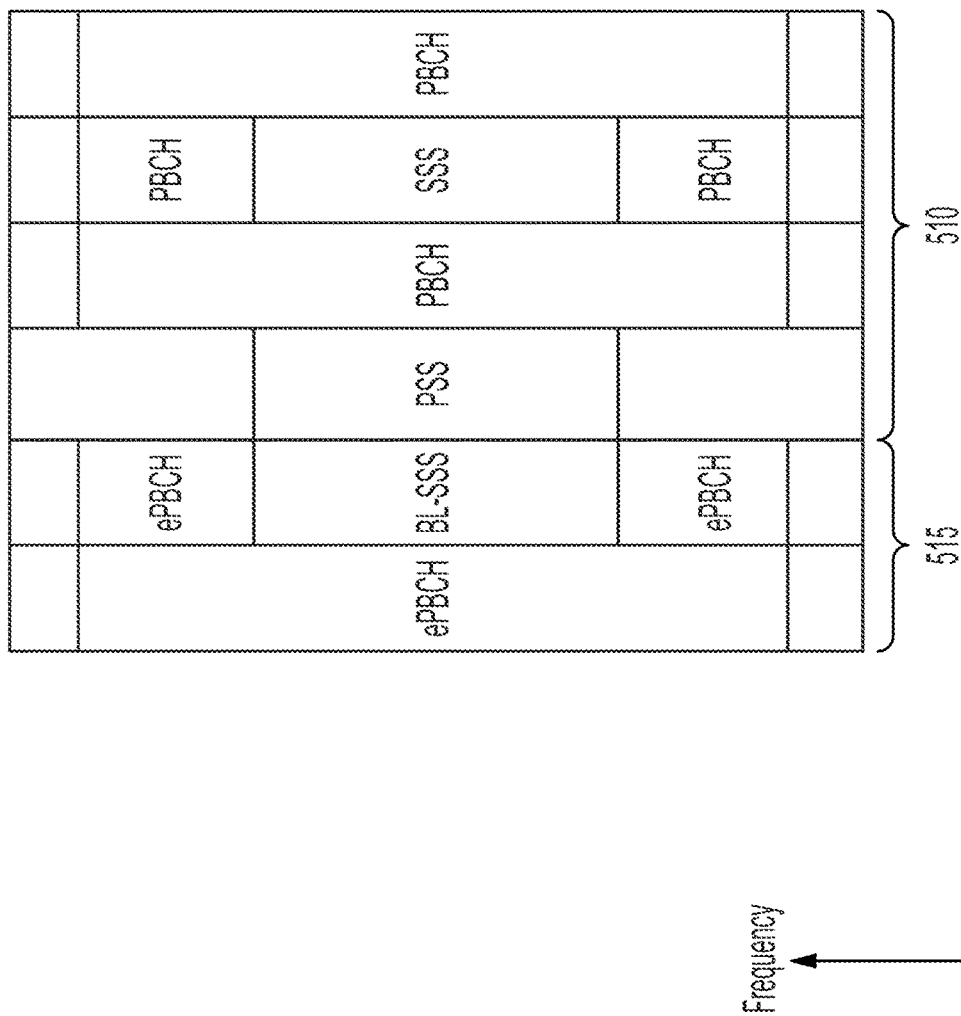
FIG. 5B is a resource element allocation diagram, according to an embodiment of the present disclosure.

In another embodiment, referred to herein as Embodiment 2, SSB resource mapping may be used. For example, the presence of a bandwidth-limited Secondary Synchronization Signal (BL-SSS) may be used to indicate support for bandwidth-limited UEs and to indicate the existence of an extended Physical Broadcast Channel (ePBCH) for bandwidth-limited UEs. The Primary Synchronization Signal (PSS), Secondary Synchronization Signal (SSS), and Physical Broadcast Channel (PBCH) structure may be re-used as illustrated in FIG. 5A. FIG. 5B is a diagram showing the relative locations of (i) the legacy SS/PBCH block 510, including the PBCH, SSS, PSS, and (ii) the additional block 515, including the BL-SSS and the ePBCH, that may be added to support bandwidth-limited UEs.

An initial access process according to Embodiment 2 may include the following steps. First, both the legacy UE and the bandwidth-limited UE may acquire the PSS. The bandwidth-limited UE may then acquire BL-SSS, the presence of which indicates support for bandwidth-limited UEs. A bandwidth-limited PSS (BL-PSS) may be used for the same purpose, instead of (or in addition to) a BL-SSS. The bandwidth-limited UE then acquires the eMIB from the ePBCH, and reads, from the eMIB, the BL-CORESET #0 configuration. The bandwidth-limited UE then monitors CORESET #0 for a DCI having a CRC scrambled by SI-BL-RNTI. The bandwidth-limited UE then acquires BL-SIB1 through scheduled PDSCH.

Figure 5C:
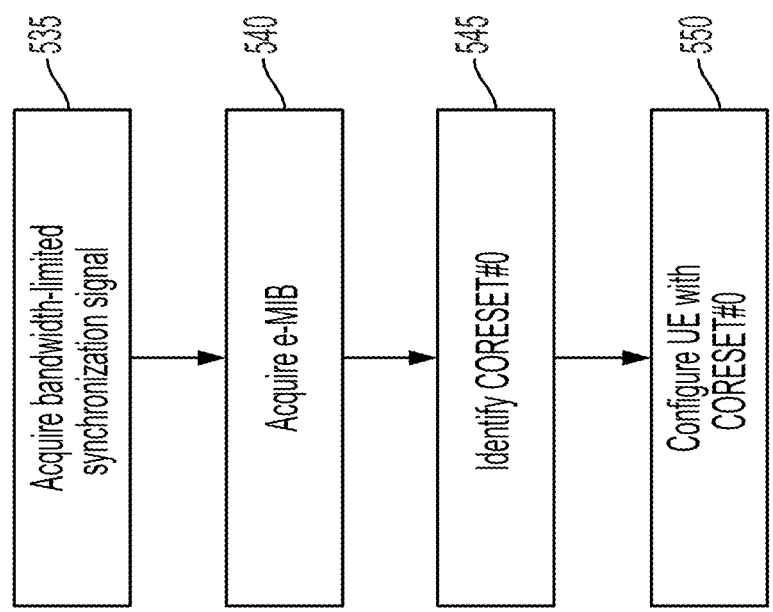
FIG. 5C is a flowchart of a portion of an initial access process, according to an embodiment of the present disclosure.

The use of Embodiment 2 may (i) consume additional PDCCH and PDSCH resources for the scheduling and transmitting of BL-SIB1, (ii) consume additional resources for ePBCH and BL-SSS, and (iii) result in the duplication of a number of SIB1 Information Elements (IE's) in BL-SIB1. However, the use of Embodiment 2 may have the advantage that it allows all CORESET #0 configurations, and that it allows full flexibility in configuring BL-CORESET #0. FIG. 5C is a flowchart of a portion of an initial access process, according to Embodiment 2. In the flowchart of FIG. 5C, the bandwidth-limited UE performs the steps of acquiring, at 535, a bandwidth-limited synchronization signal; acquiring, at 540, an extended MIB (e-MIB) containing a first set of identifying bits; identifying, at 545, an initial control resource set (CORESET), based on the first set of identifying bits; and configuring, at 550, the bandwidth-limited UE with the initial CORESET.

In another embodiment, referred to herein as Embodiment 3, initial Bandwidth Part (BWP) switching is used in the initial access process. A reduced capability UE may have a reduced number of receiving (RX) antennas, resulting in a greater need for resources for PDCCH and PDSCH. To compensate for the coverage reduction that may result from a reduced number of receive antennas, more downlink resources may be employed to serve the same number of reduced capability UEs in a given coverage area. Unless the initial BWP configured to a reduced capability UE is allowed to be larger than the RF bandwidth of the reduced capability UE, it may be challenging to support a similar number of UEs as for enhanced Mobile Broadband (eMBB). In Rel-15, all of the downlink common signals and channels before Radio Resource Control (RRC) connection setup (such as Paging and messages for the Random Access Channel (RACH), as well as all of the scheduling DCIs) are transmitted in the initial BWP. Therefore, if only the initial BWP is used for all reduced capability UEs, there may be congestion in the initial access for reduced capability UEs, for both downlink and uplink.

Another issue may be that for message 1 transmission, when 8 RACH Occasions (ROs) are frequency division multiplexed (FDMed) with 30 kHz subcarrier spacing (SCS), the total bandwidth is larger than 20 MHz for initial access. If a reduced capability UE supports a maximum bandwidth of 20 MHz (i.e., a maximum uplink initial BWP size of 20 MHz), the ROs outside of the uplink initial BWP cannot be used, and hence the UE may not be able to transmit Physical Random Access Channel (PRACH) corresponding to the best SSB.

The following two options, referred to as Option 1 and Option 2, may be used to alleviate the above two issues. In each of these options, the reduced capability UEs may operate with uplink and downlink initial BWPs differing from the legacy uplink and downlink initial BWPs (where each of the "legacy initial BWPs" is an initial BWP identified by the network in the SIB1 as the initial BWP (e.g., the uplink initial BWP or the downlink initial BWP) to be used by legacy UEs). In Option 1, DCI-based initial BWP switching on message 2 of the initial access process is used to offload both downlink and uplink signaling load across a set of different downlink or uplink initial BWPs for reduced capability UEs, instead of using only one initial uplink or downlink initial BWP configured in SIB1. A specific new uplink and downlink initial BWP is configured by the gNB for each reduced capability UE using the same RO and Preamble. A set of new ROs for bandwidth-limited reduced capability UEs may be defined, as well as a new mapping between SSB index and the new ROs for beam pairing. The new ROs can be nonoverlapping, partially overlapping, or fully overlapping with the legacy ROs.

Figure 6C:
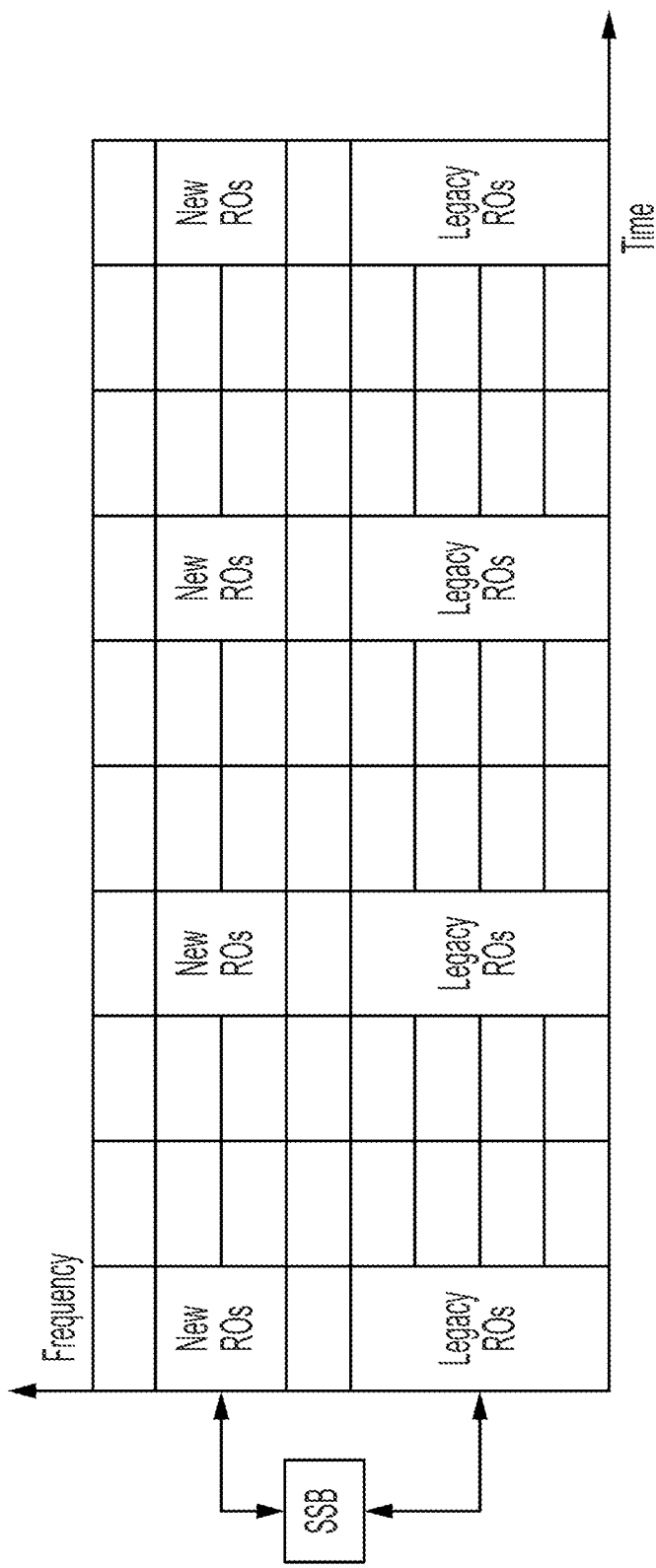
FIG. 6C is a resource element allocation diagram, according to an embodiment of the present disclosure.

For downlink initial BWPs for reduced capability UEs, the network may offload different reduced capability UEs to different initial BWPs as shown in FIG. 6A. FIG. 6A illustrates that the network may offload reduced capability UEs to one or more different uplink initial BWPs (each different from the legacy uplink initial BWP) and one or more different downlink initial BWPs (each different from the legacy downlink initial BWP). In particular, upon receiving message 1, the network decides for each reduced capability UE to perform a downlink initial BWP switch, via a DCI in message 2 (as illustrated in FIG. 6B), such that each reduced capability UE within the same RO is allocated a specific initial BWP. For uplink initial BWPs, the network supporting reduced capability may have an additional mapping between SSB index and new ROs for bandwidth-limited reduced capability UEs. Reduced capability UEs are informed (i) of this new mapping, and (ii) of the new ROs, in SIB1. The frequency or time resources (or both) of the new ROs may be nonoverlapping, partially overlapping, or fully overlapping with the frequency or time resources (or both) of the legacy ROs, as shown, for one example, in FIG. 6C. If the new RO overlaps with a legacy RO, the network may determine whether to apply the legacy SSB index mapping rule or a new mapping rule based on the specific preamble used by the reduced capability UEs in message 1. Upon message 1 transmission using the new ROs and new mapping by reduced capability UEs, the network knows (i) the set of reduced capability UEs in the cell and (ii) beam pairing information. The network then selects and configures a specific uplink initial BWP for each reduced capability UE, such that reduced capability UEs are distributed over different new uplink initial BWPs for message 3 transmission. For example, the reduced capability UEs may be randomly distributed over different uplink initial BWPs. As another example, the reduced capability UEs may be distributed over different uplink initial BWPs with a probability inversely proportional to the number of UEs in that uplink initial BWP. The network may also (in message 2) select and configure a specific downlink initial BWP for each reduced capability UE. For a given reduced capability UE, the uplink and downlink initial BWPs may each be different from the initial BWP used to transmit the SSB, and the uplink and downlink initial BWPs may be different from each other.

Downlink initial BWP switching for reduced capability UEs may also occur when reduced capability UEs are in the RRC_connected state. For example, a reduced capability UE's current downlink initial BWP may not contain the SSB. When the reduced capability UE makes Radio Resource Management (RRM) measurements or performs initial access, the reduced capability UE may perform a downlink initial BWP switch to the downlink initial BWP that contains the SSB. As another example, a reduced capability UE may perform initial BWP hopping among different downlink initial BWPs across the whole carrier bandwidth to harvest the frequency diversity gain.

Figure 6D:
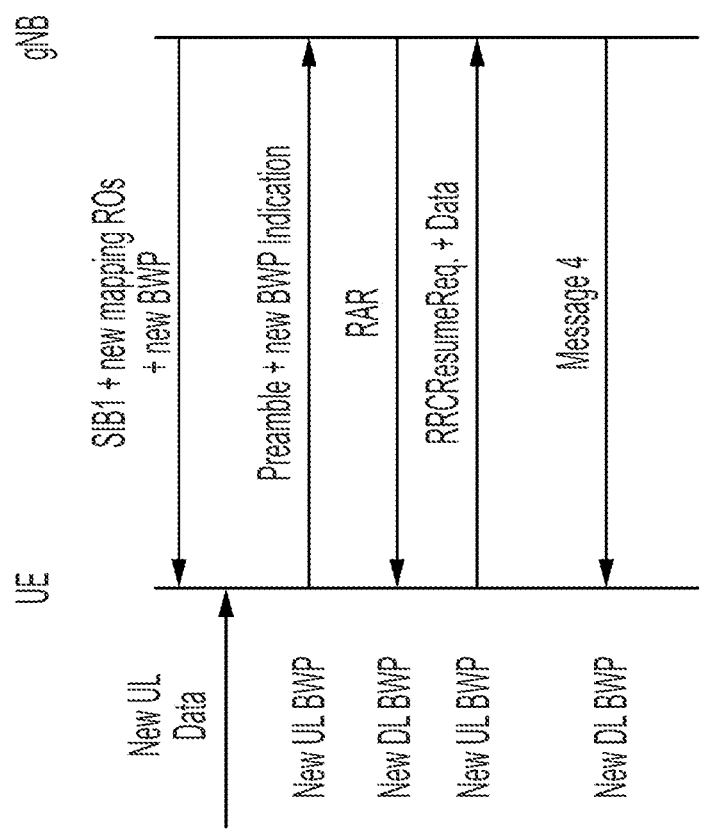
FIG. 6D is an illustration of an initial access process, according to an embodiment of the present disclosure.

In Option 2 (which is illustrated in FIG. 6D), the network may allocate a set of possible initial BWPs for reduced capability UEs in SIB1 or in a separate extended SIB1 (eSIB1) transmitted by the network for use by reduced capability UEs. Each reduced capability UE may then autonomously select one initial BWP for PRACH to balance the load across different initial BWPs (instead of all of the reduced capability UEs sharing one initial BWP). Each reduced capability UE may then inform network of its choice of initial BWP in message 1. As in Option 1, the network may (in message 2) select and configure a specific downlink initial BWP for each reduced capability UE.

The network pre-configures a set of uplink initial BWPs, and configures the new ROs in each of the configured uplink initial BWPs. The network also configures a set of downlink initial BWPs so that the reduced capability UEs need not share a single downlink initial BWP. The network also pre-configures a new SSB index to RO mapping rule specific for reduced capability UEs in the new ROs, i.e., the network pre-configures a new mapping between SSB index and new ROs in each uplink initial BWP. The network informs the reduced capability UEs of all of the above configurations in the SIB1 message. Each of the reduced capability UEs then autonomously selects one initial uplink and downlink initial BWP for PRACH to balance the load across different initial BWPs (instead of all of the reduced capability UEs sharing one initial BWP). Each reduced capability UE may inform the network of its choice of downlink and uplink initial BWP in message 1, e.g., via a specific preamble or the combination of a specific preamble with new ROs. For example, if the new RO overlaps with the legacy RO, the selected uplink and downlink initial BWP is indicated by the specific preamble for a reduced capability UE or by the combination of specific preambles and the new RO.

Figure 6E:
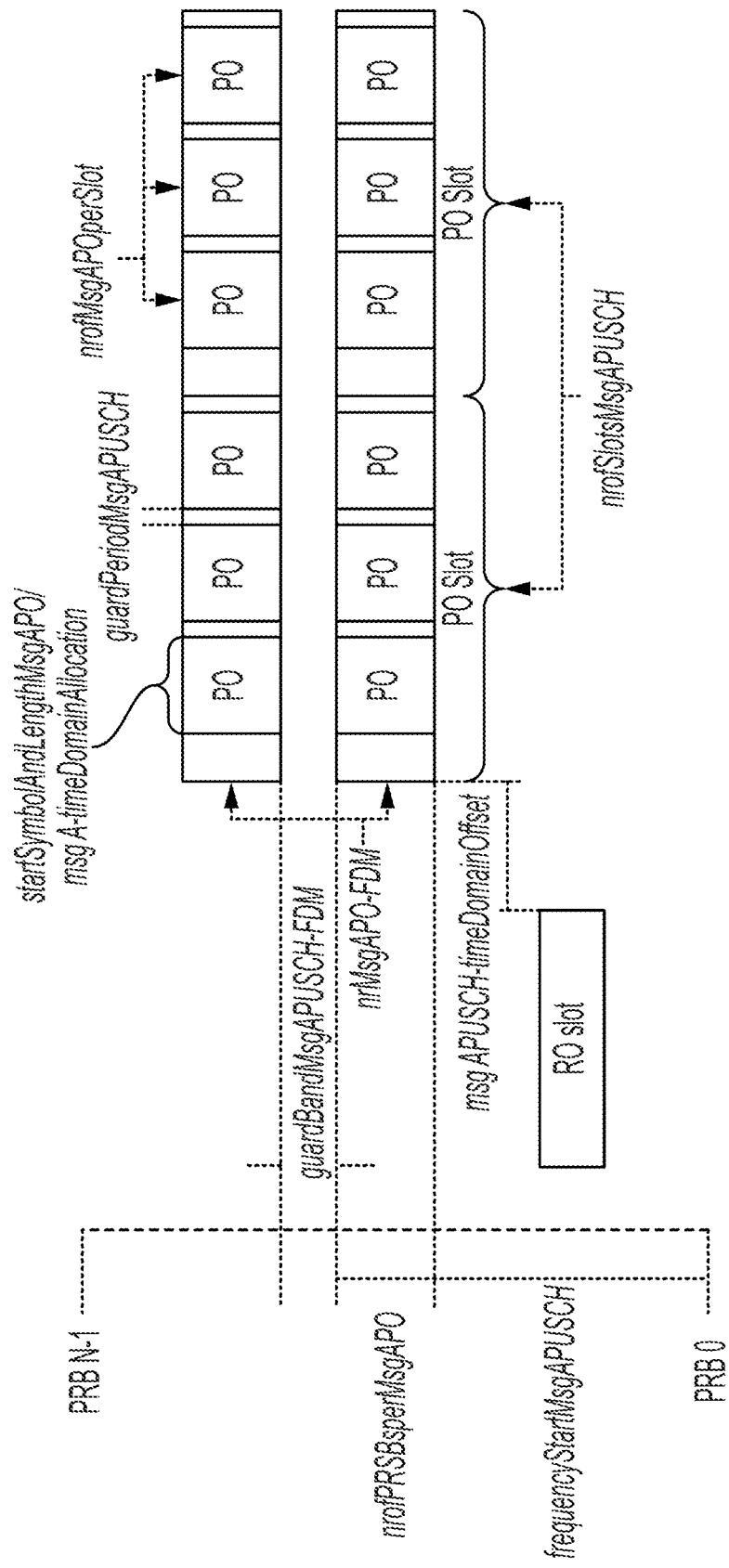
FIG. 6E is a resource element allocation diagram, according to an embodiment of the present disclosure.

In the case of 2-step RACH, to support reduced capability UEs, the network pre-defines, as illustrated in FIG. 6E, a separate SSB to RO and SSB to PUSCH occasion (PO) mapping, tailored to support the limited bandwidth of reduced capability UEs. In particular, a new mapping rule between SSB, ROs and POs, and new ROs and new POs is defined, per initial BWP, for reduced capability UEs, and transmitted to reduced capability UEs in SIB1. The new POs for reduced capability UEs may partially or fully overlap with legacy ROs. The reduced capability UEs may be configured with a set of downlink and uplink initial BWPs in SIB1, and each UE may autonomously select one downlink initial BWP and one uplink initial BWP and inform the network.

Figure 6F:
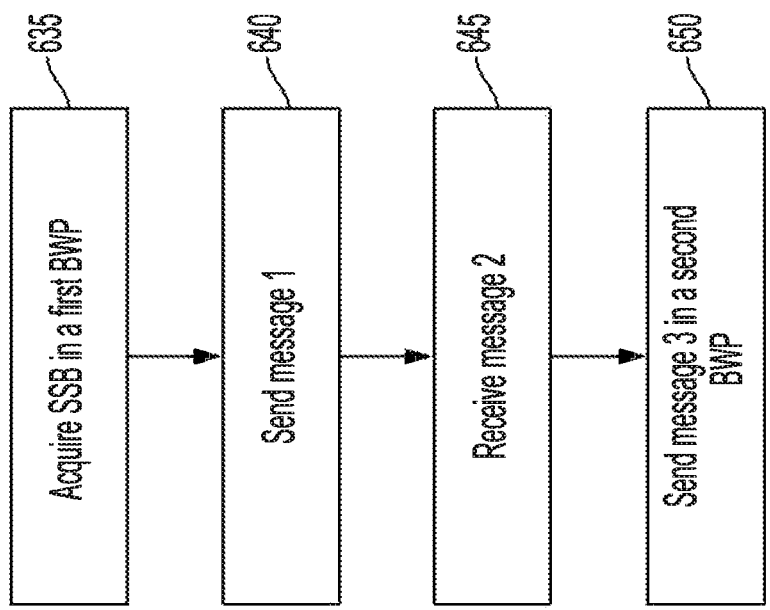
FIG. 6F is a flowchart of a portion of an initial access process, according to an embodiment of the present disclosure.

FIG. 6F is a flowchart of a portion of an initial access process, according to Embodiment 3. In the flowchart of FIG. 6F, the bandwidth-limited UE performs the steps of acquiring, at 635, in a signal from a network, a Synchronization Signal Block (SSB), in a first initial Bandwidth Part (BWP); sending, at 640, a first message, to the network; receiving, at 645, a second message, from the network; and sending, at 650 a third message, to the network, in a second initial BWP, different from the first initial BWP.

In some embodiments, methods described herein may be performed by a processing circuit of the UE, or by a processing circuit of the network or both. For example, the processing circuit of the UE may send (via a radio in the UE), to a network, message 1 and message 3 of the initial access process. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for accommodating reduced capability user equipment in a mobile network have been specifically described and illustrated herein, many modifications and variations will be apparent to those skilled in the art. Accordingly, it is to be understood that a system and method for accommodating reduced capability user equipment in a mobile network constructed according to principles of this disclosure may be embodied other than as specifically described herein. The invention is also defined in the following claims, and equivalents thereof.

What is claimed is:

1. A method, comprising:
acquiring, by a bandwidth-limited user equipment (UE) having a bandwidth capability, a signal from a network, the signal comprising:
a System Information Block #1 (SIB1) defining a legacy initial bandwidth part (BWP); and
a bandwidth-limited Secondary Synchronization Signal (BL-SSS) indicating support, by the network, for the bandwidth-limited UE;
sending, by the bandwidth-limited UE, a first message to the network indicating the bandwidth-limited UE's choice of an initial BWP;
receiving, by the bandwidth-limited UE, a second message from the network indicating an initial BWP switch;
in response to the initial BWP switching indicated in the second message, sending, by the bandwidth-limited UE, a third message to the network in a first initial BWP that is different from the legacy initial BWP; and
receiving, by the bandwidth-limited UE, a fourth message from the network in a second initial BWP that is different from the legacy initial BWP.

2. The method of claim 1, in wherein the second message comprises a first BWP identifier for identifying the first initial BWP, and
wherein the sending of the third message comprises sending the third message in the first initial BWP.

3. The method of claim 1, wherein the receiving of the fourth message comprises receiving the fourth message in the second initial BWP.

4. The method of claim 3, wherein the second initial BWP is different from the first initial BWP.

5. The method of claim 3, wherein the second message comprises a second BWP identifier for identifying the second initial BWP.

6. The method of claim 3, further comprising receiving, by the bandwidth-limited UE, in the SIB1 or in an extended SIB1 (eSIB1), a second BWP identifier for identifying the second initial BWP.

7. The method of claim 1, further comprising receiving, by the bandwidth-limited UE, in the SIB1 or in an extended SIB1 (eSIB1), a list of available initial BWPs including the first initial BWP,
wherein the sending of the first message comprises sending the first message in the first initial BWP.

8. The method of claim 7, further comprising selecting, by the bandwidth-limited UE, the first initial BWP from the list of the available initial BWPs.

9. The method of claim 8, wherein the first message comprises a notification of the bandwidth-limited UE's selection of the first initial BWP.

* * * * *

UNITED STATES PATENT AND TRADEMARK OFFICE
CERTIFICATE OF CORRECTION

PATENT NO. : 12,363,769 B2  
APPLICATION NO. : 17/234754  
DATED : July 15, 2025  
INVENTOR(S) : Liang Hu et al.

Page 1 of 1

It is certified that error appears in the above-identified patent and that said Letters Patent is hereby corrected as shown below:

In the Drawings

Sheet 6 of 13, Fig. 5A, Line 5, delete "SSBbocks)" and insert -- SSBblocks) --.

In the Claims

In Column 12, Line 30, in Claim 2, after "claim 1," delete "in".

Signed and Sealed this  
Eighteenth Day of November, 2025

John A. Squires  
*Director of the United States Patent and Trademark Office*